United States Patent [19]

Chamberlain

[11] 4,207,968
[45] Jun. 17, 1980

[54] DOUBLE DISC TYPE BRAKE SYSTEM

[75] Inventor: Richard W. Chamberlain, Aurora, Ill.

[73] Assignee: Caterpillar Tractor Co., Peoria, Ill.

[21] Appl. No.: 879,306

[22] Filed: Feb. 21, 1978

[51] Int. Cl.² .................................... F16D 55/04
[52] U.S. Cl. .............................. 188/71.4; 188/71.5;
 188/72.3; 188/72.4; 188/73.2; 188/369; 192/85
 AB; 303/6 A
[58] Field of Search ................. 188/71.4, 71.5, 72.4,
 188/366, 369, 73.2, 72.3; 192/85 BA; 303/6 A

[56] References Cited

U.S. PATENT DOCUMENTS

| | | | |
|---|---|---|---|
| 1,839,298 | 1/1932 | Charles | 188/347 X |
| 1,961,207 | 6/1934 | Dierfeld | 188/71.5 X |
| 2,888,101 | 5/1959 | Bayles | 188/71.5 |
| 3,155,197 | 11/1964 | Lee et al. | 188/72.4 X |
| 3,160,238 | 12/1964 | Jagenberg | 188/366 |
| 3,199,374 | 8/1965 | O'Malley et al. | 188/344 X |
| 3,765,519 | 10/1973 | Kell | 188/72.4 X |
| 4,064,974 | 12/1977 | Filderman | 188/71.5 X |

FOREIGN PATENT DOCUMENTS 587271 1/1959 Italy ........................... 188/71.5

*Primary Examiner*—George E. A. Halvosa
*Attorney, Agent, or Firm*—Sixbey, Bradford & Leedom

[57] ABSTRACT

A double, disc type brake system for wheeled vehicles, including two disc packs, operationally combined in a working set, for each vehicle wheel to be braked, the disc packs in each set being respectively placed in back to back relationship, and the disc packs having hydraulically operated multiple pistons for actuation thereof, the multiple pistons constituting two oppositely faced piston sets operatively positioned in a common actuator support centrally disposed between the two disc packs of each set, and the two piston sets being respectively operable to actuate the two disc packs of the set. The hydraulic system is operable to initially actuate one disc pack of each set upon movement of a brake pedal through a first increment of application for light braking action, and to inclusively actuate the other disc pack of each set upon movement of the pedal in an additional increment of application for increased braking action.

10 Claims, 9 Drawing Figures

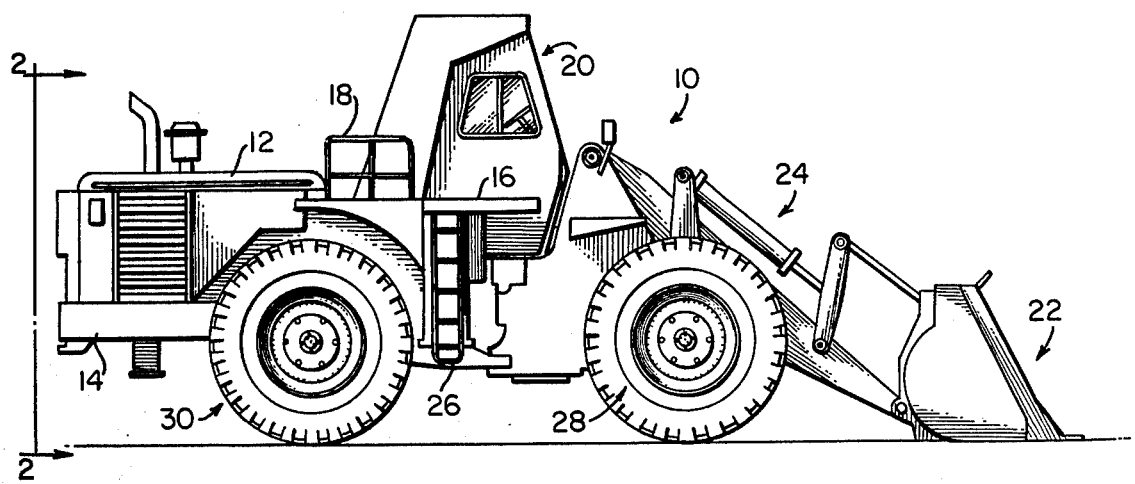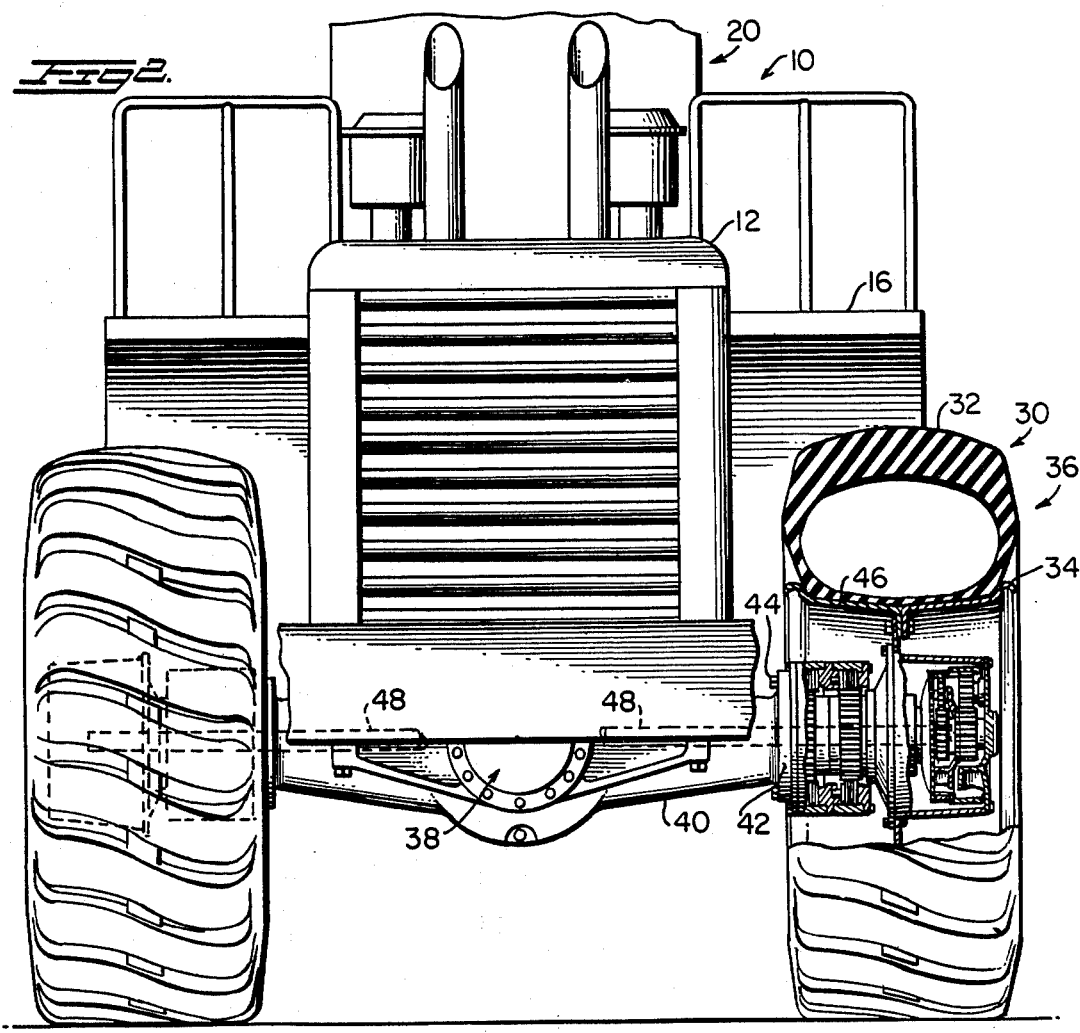

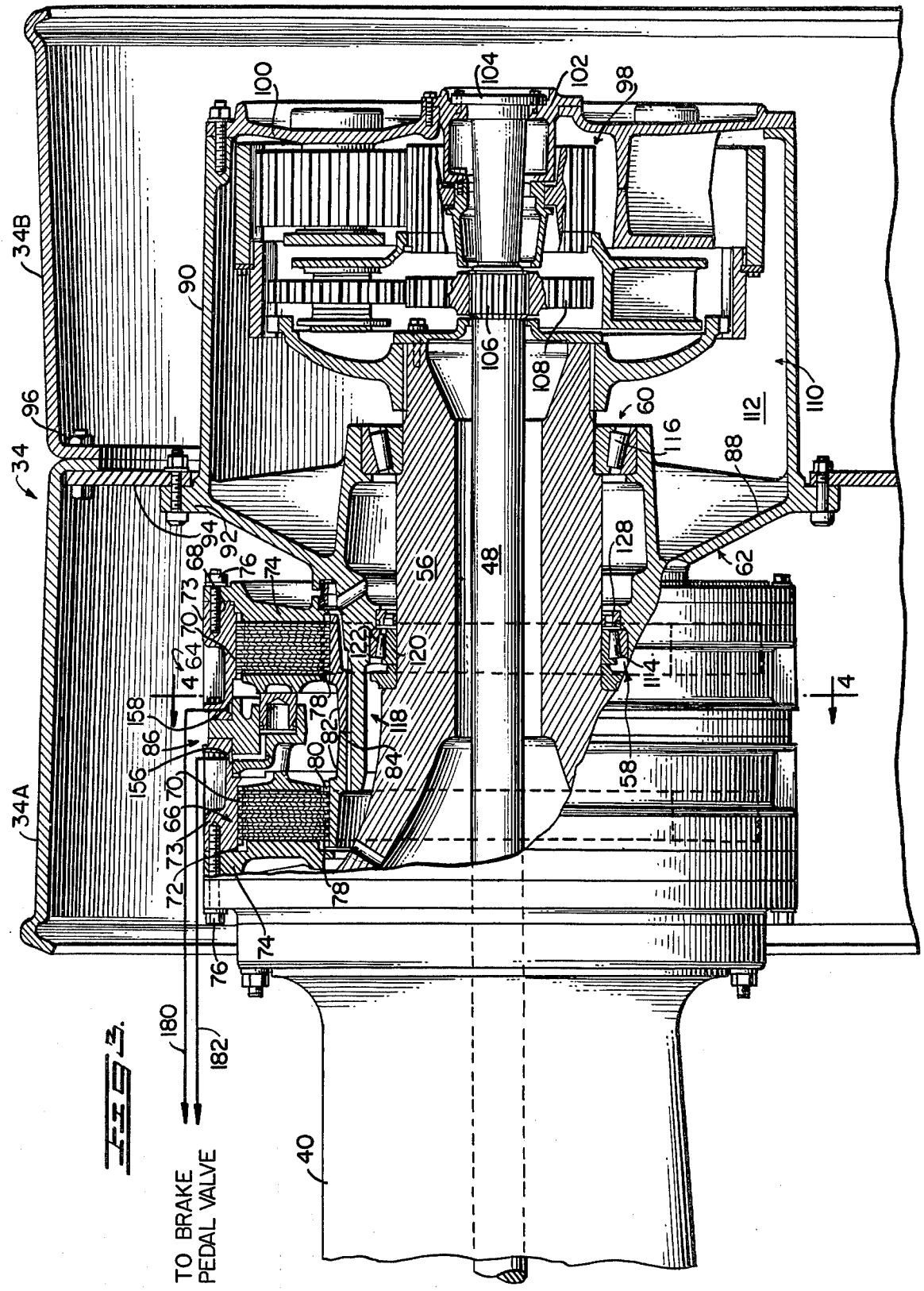

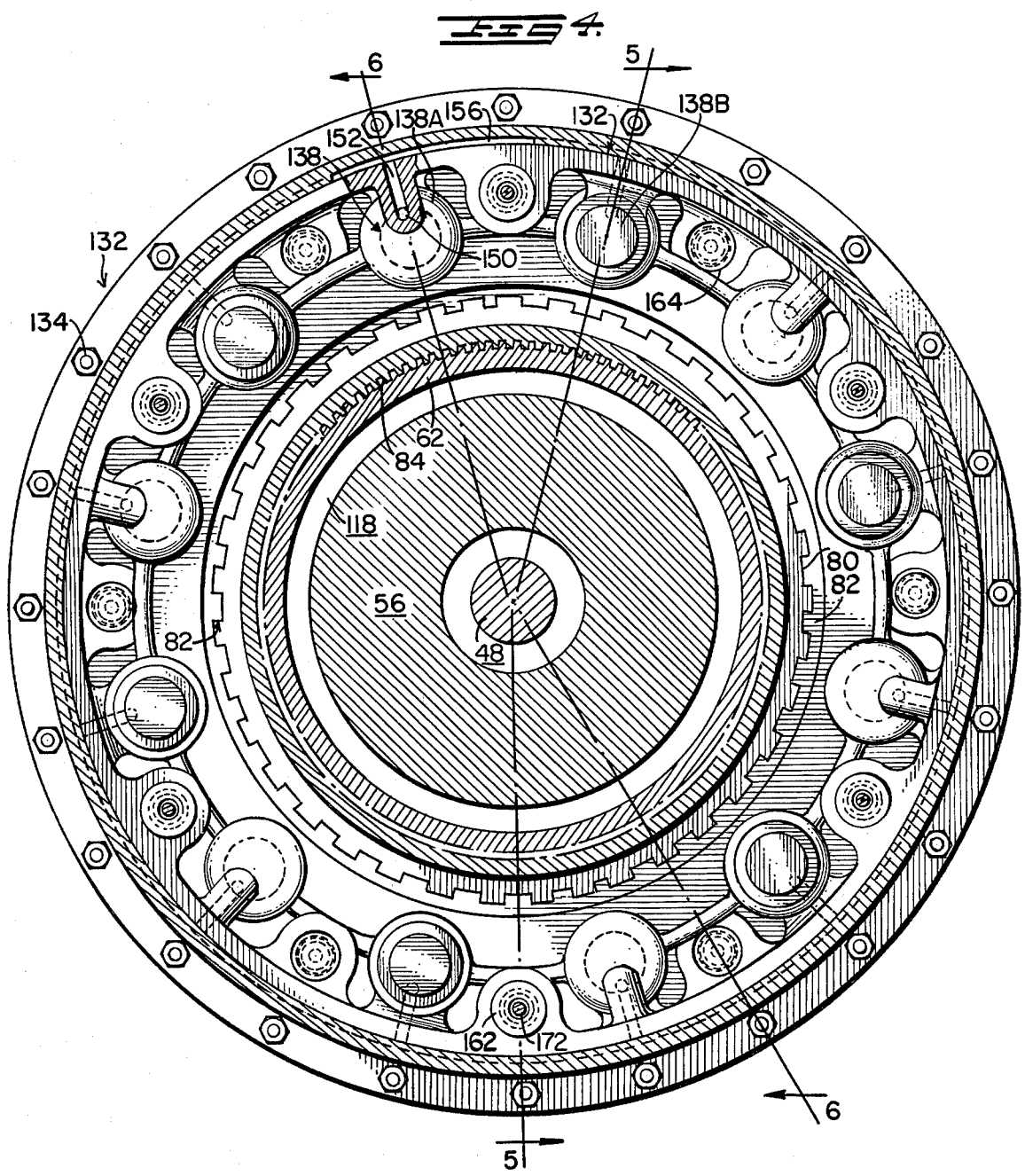

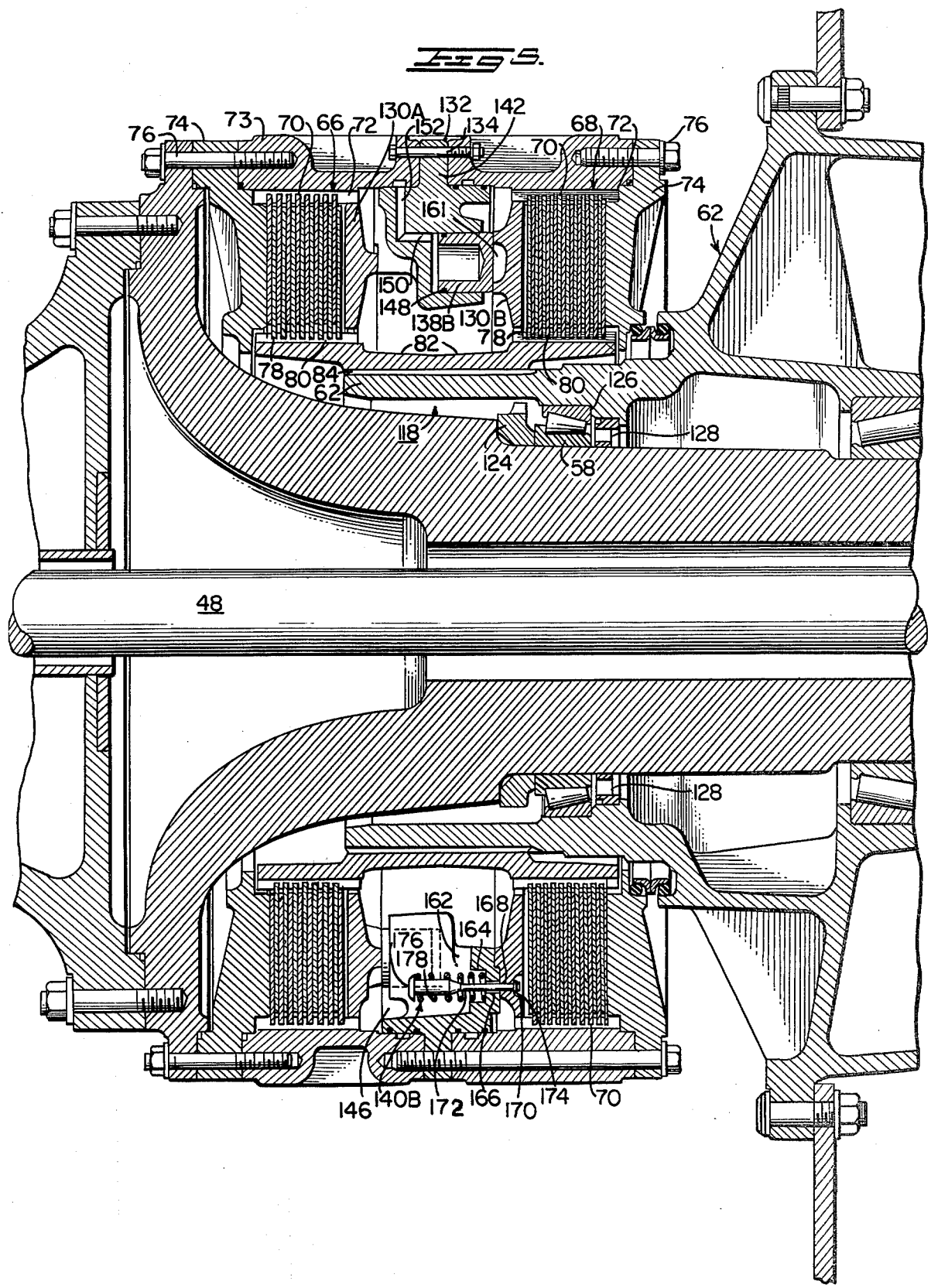

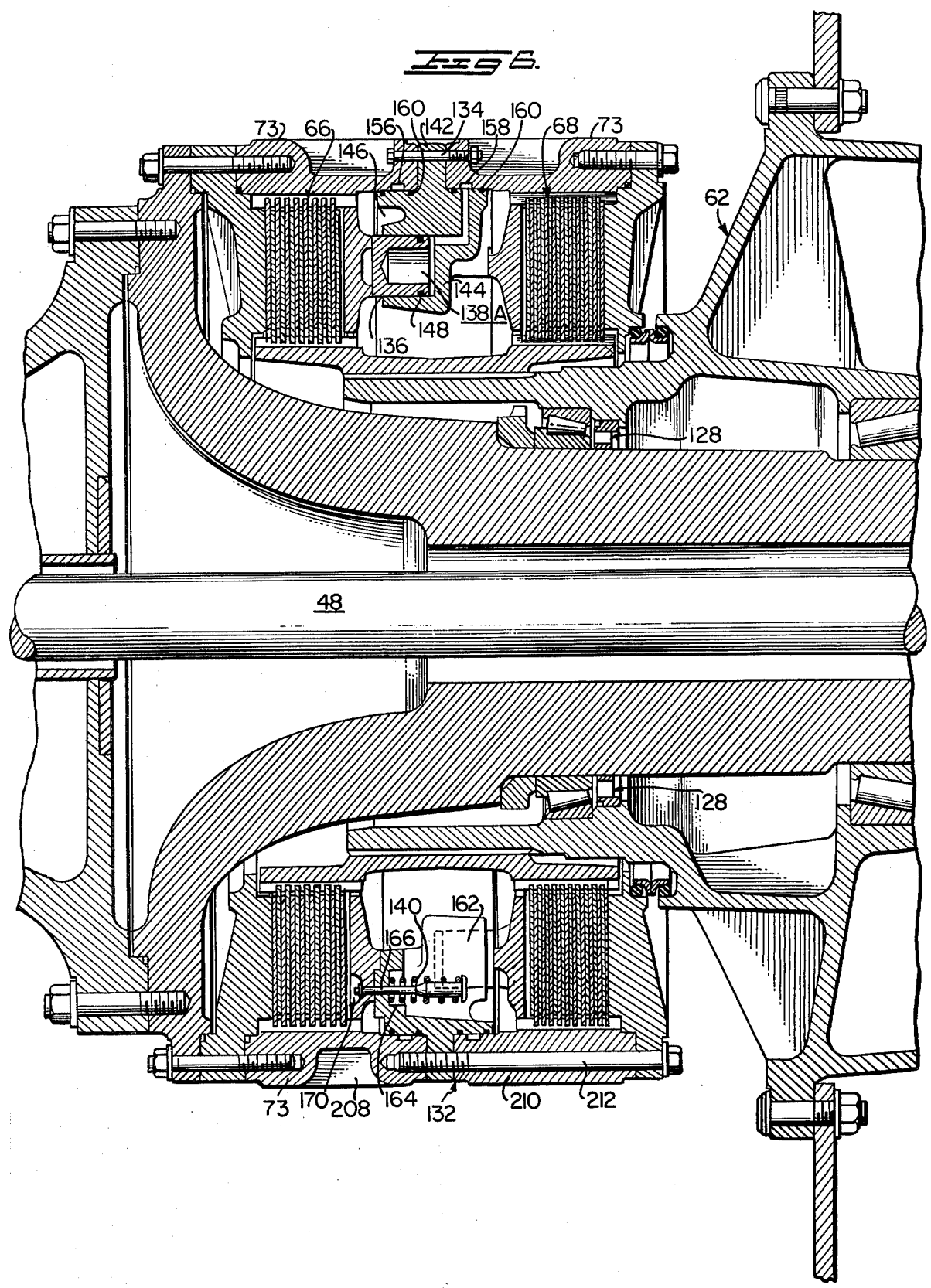

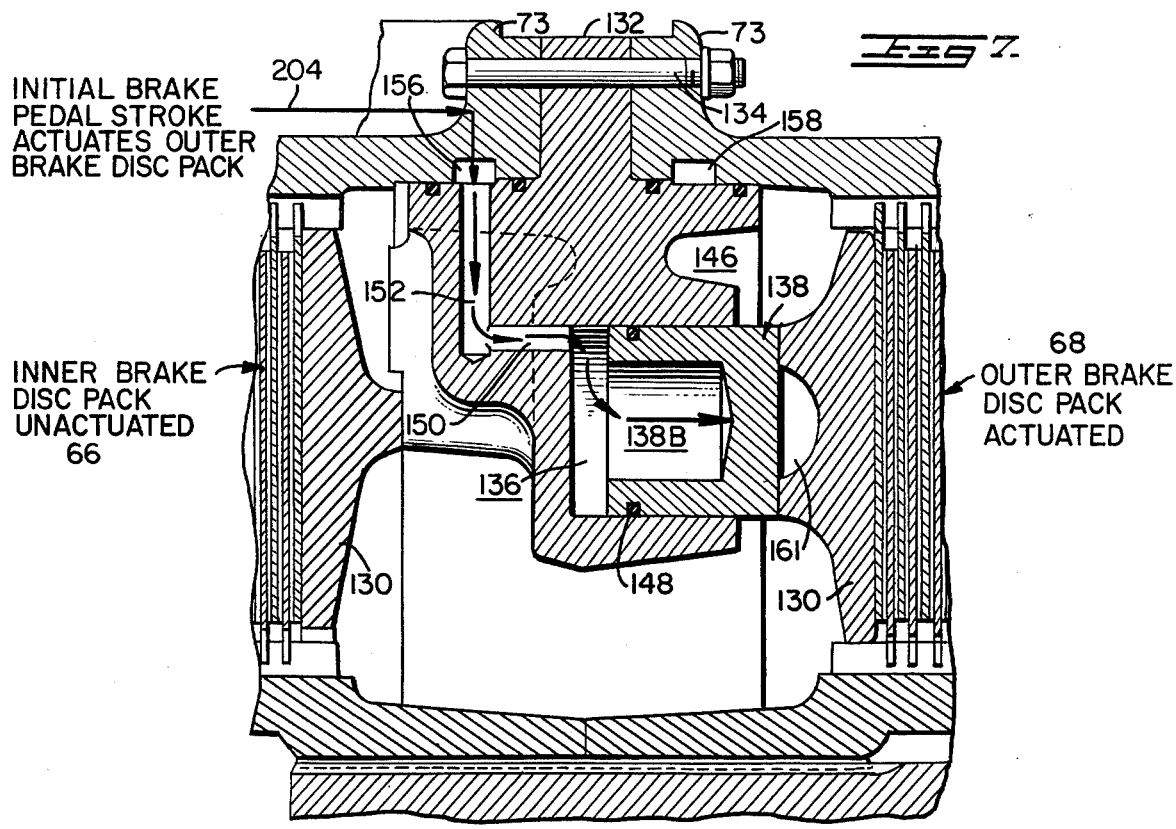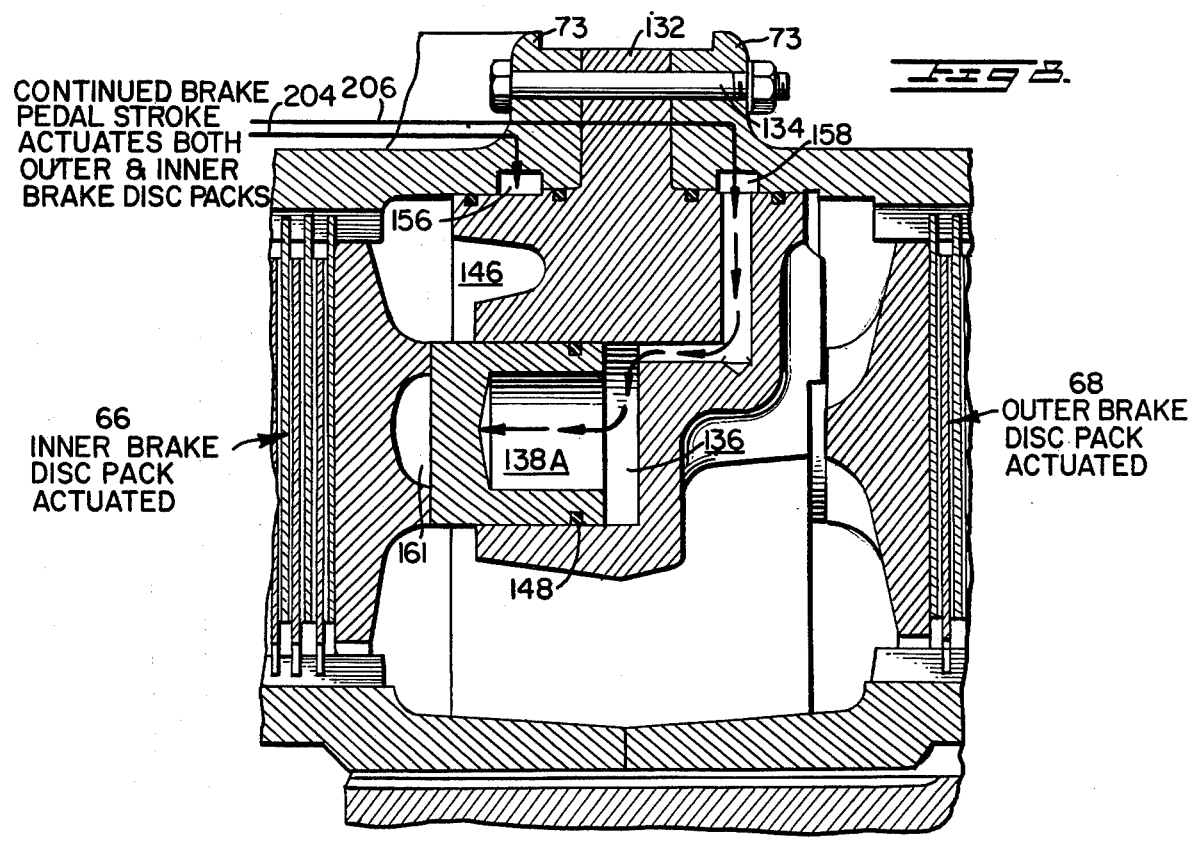

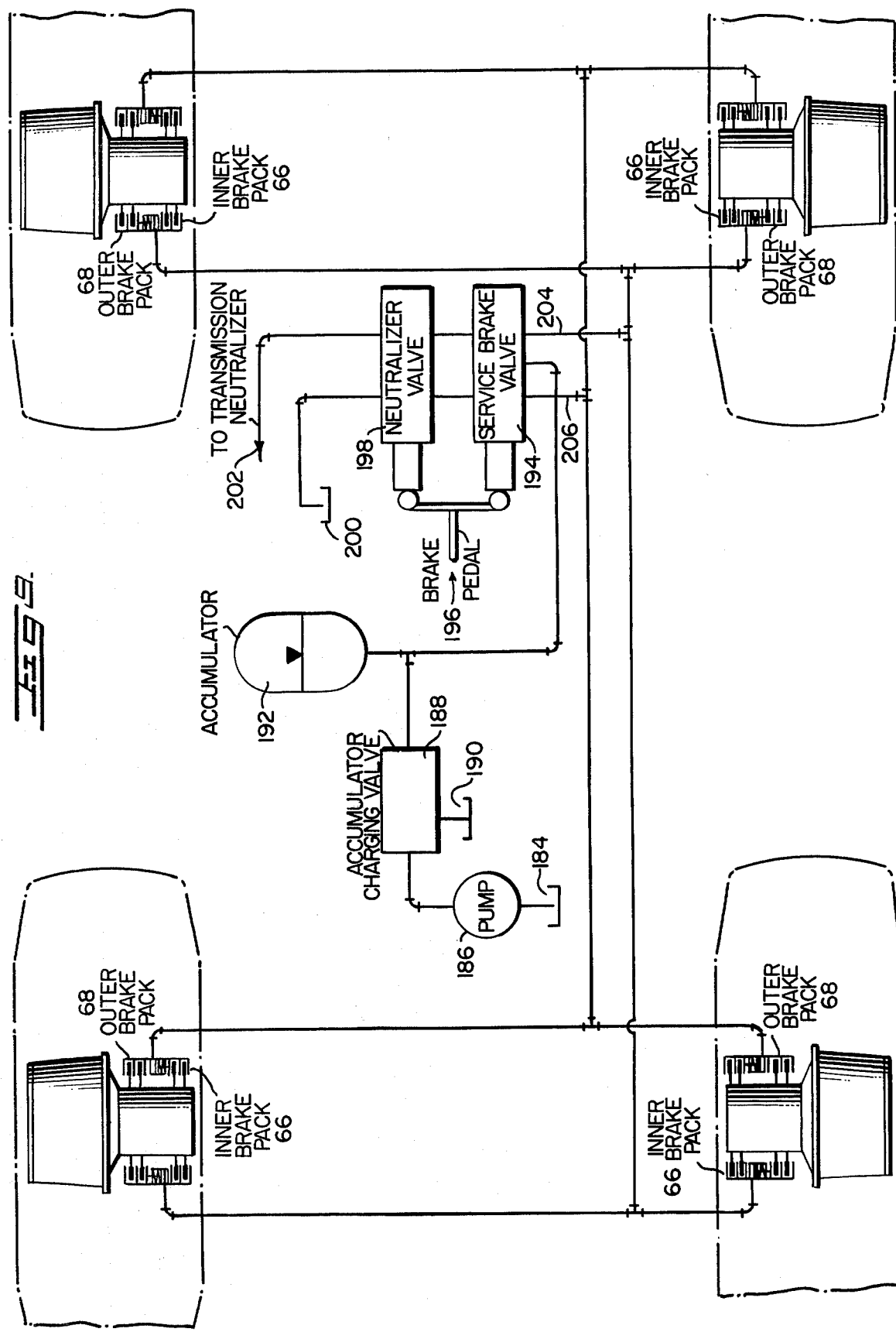

DOUBLE DISC TYPE BRAKE SYSTEM

BACKGROUND OF THE INVENTION

The present invention relates generally to wheeled vehicles, in the nature of heavy duty apparatus used for construction, earth working, and earth moving and the like.

More specifically the invention relates to a braking system for such vehicles of substantial size and weight which in operation have high momentum forces created and which must be overcome in braking and stopping the vehicles.

In some vehicles of the general type to which the present invention is applied, wheeled final drive assemblies and braking systems therefore have been incorporated positionally and operationally within a vehicle wheel hub. A brake system of this type, and consisting of a disc brake system, is disclosed in U.S. Pat. No. 3,301,359, dated Jan. 31, 1967, entitled BRAKING APPARATUS, and owned by the assignor of the present application.

A braking system and mechanism disclosed in that patent, and other known systems, while proving effective in some vehicles, have disadvantages when used in vehicles of greatly increased size and weight, wherein the forces which must be overcome in braking require substantially greater braking forces.

As vehicles grow in size, larger and larger brakes are needed to cope with the increased weight factors and operational momentums involved. It has been proposed to use multiple disc brakes, and systems generally including such multiple disc brakes are known. In some known systems multiple piston actuated brakes are used. Increased brake capacity in such systems can be gained in three principal ways, namely, by increasing the diameter of the discs or brake members; by increasing the number of coacting friction surfaces; and by increasing brake application pressure. Diameter size increases are limited by manufacturing size capabilities, however. The number of coacting friction surfaces, such as discs, is limited by the efficiency of a pack, and cooling of the discs in, and the pack. Application pressures are limited by state of the art control systems for the vehicles.

In attempts to attain the required braking capacity for large machine brakes, one or more of the foregoing listed limits must be exceeded if conventional brake systems are used. Heretofore however a solution has not been reached.

Some known disc brake systems are of a normally oil flooded disc brake type, wherein the disc packs are enclosed within cavities or areas in which cooling and lubricating oils are circulated to overcome heat problems encountered when using disc brakes in heavier machines. A system, generally disclosing increased cooling capacities is shown and described in my copending patent application entitled "BRAKE LUBRICATION AND COOLING SYSTEM," Ser. No. 879,305, filed Feb. 21, 1978, now U.S. Pat. No. 4,140,198, and assigned to a common assignee herewith. Such system while constituting an improvement, does not result in fulfillment of the overall requirements of braking for the larger vehicles.

DESCRIPTION OF THE PRIOR ART

Heretofore, as above pointed out, braking systems in some wheeled vehicles have been placed within a wheel loader final drive wheel, and have included oil flooded disc brake types and in certain vehicles the systems have proved satisfactory.

When considering vehicles of substantially increased size and weight however, the single disc brake constructions previously used have been inadequate to provide the substantial forces required for braking of the vehicles.

Some multiple disc brakes and systems encompassing the same have also heretofore been utilized, but have not proven entirely satisfactory from an operational or constructional point of view, with simplicity of construction and operation in mind, as also feasible production costs.

A brake system utilizing braking discs which will provide the necessary operating limits, while staying within limitations as hereinbefore set forth, and yet increasing capacity as required have not heretofore been realized. In order to obtain the required braking capacity for large machine brakes, the existing structural and operational limits would be exceeded if conventional known brake systems were used.

It is an object of the present invention to provide a braking system which overcomes the problems heretofore involved, and which provide the increased capacity in a reasonable, constructionally sound, and relatively economic manner.

SUMMARY OF THE INVENTION

The present invention is therefore directed to a new and novel braking system of a multiple disc type, and particularly where the brake system is incorporated in vehicles of substantial size and weight, and which accordingly create very substantial momentum forces which must be overcome in braking.

The present invention overcomes the limitations of conventional brake systems as above itemized. In order to overcome the problems, the diameter and pressure limits of the known systems are used, whereas the number of coacting friction surfaces is allowed to go beyond the limit. In accomplishing this, the discs are divided into two equal packs for each brake, and this brings the number of discs per pack within efficiency limits of a pack, and with required cooling of the pack. The disc packs to this end are positioned in a back to back arrangement, and a new and unique common brake component actuator support is disposed centrally between. Actuation of each pack is obtained through use of a plurality of operating pistons which are operably mounted in the common actuator support, with appropriate hydraulic actuating means and mechanism being provided to functionally actuate half of the number of multiple or plural pistons to actuate one pack, and the other pistons to actuate the second pack.

The multiple pistons as used in brakes are known but not as applied in back to back multiple pack disc brakes.

The common actuator support is initially cast, and various recesses, ports, relief areas and the like are provided, and including recesses for operable sliding positionment therein of the multiple pistons, which extend from opposed surfaces of the common actuator in sets consisting of half of the overall number, and with each set adapted to operate one of the back to back disc packs.

The common actuator is additionally designed to operatively mount return springs which are operably interconnected between the common actuator support and identical actuator plates which are used to apply braking forces to the brake packs.

A further feature resides in machining back plates used in the brake packs from a common casting, and rotors used in the mechanism are identical parts as are the stators.

The present invention permits light to normal severity of braking by utilizing a hydraulic control means which initially applies one pack of discs with a partial brake pedal movement, and at a predetermined point of pedal movement and pressure a second pack of discs is applied for heavier to maximum severity braking. This results in a better modulation of application for smoother braking.

The use of multiple pistons, as applied in the present invention, provides an additional advantage in that a substantial reduction in the total length of pressure sealed surface is realized as compared with a single actuating piston, and this results in an increase in actuation efficiency.

It is also to be noted that the common actuator support is constituted of an initially cast member, having a minimum of possible areas or points of obstruction to oil flow, thereby resulting in increased efficiency and greater cooling efficiency of the discs and disc packs.

Additional objects, features and advantages of the invention will be more readily apparent from the following detailed description of an embodiment thereof when taken together with the accompanying drawings in which:

FIG. 1 is a side elevational view of a wheeled vehicle, more particularly a front end loader of a type and size with which the present brake system is associated;

FIG. 2 is a fragmentary enlarged rear elevational view, with portions broken away, and in section, for clarity and disclosure, and with portions in broken lines to disclose structural association;

FIG. 3 is an enlarged fragmentary view, with parts broken away, and partially in section, of a wheel final drive assembly and system, and with a multiple oil immersed disc brake system in accordance with the invention associated therewith;

FIG. 4 is a sectional view taken on line 4—4 of FIG. 3, partly in section, disclosing in greater detail actuating mechanism for the brake disc packs, and associated mechanics;

FIG. 5 is an enlarged, fragmentary, sectional view taken on line 5—5 of FIG. 4 showing in greater detail brake applying and retracting means for the outer disc pack;

FIG. 6 is an enlarged, fragmentary, sectional view taken on line 6—6 of FIG. 4, showing in greater detail brake applying and retracting means for the inner disc pack;

FIG. 7 is an enlarged fragmentary view, partly in section, showing an initial brake application, with only the outer disc pack actuated;

FIG. 8 is an enlarged fragmentary view, similar to FIG. 7, showing a succeeding brake application, with both the inner disc pack and the outer disc pack actuated; and FIG. 9 is a schematic of the hydraulic brake actuating circuit of the invention.

DETAILED DESCRIPTION

Referring now in detail to the drawings, there is shown in FIG. 1, and generally designated 10, a wheeled front end loader which includes an engine compartment assembly 12, a bumper 14, an operator's platform 16 having a guard rail 18, an operator's cab 20, a bucket of a general type 22 operable through hydraulic piston and cylinder means generally shown at 24, and an access ladder 26 to the operator's platform. The vehicle is equipped with wheel and tire units or assemblies 28 and 30. The vehicle is a structure manufactured by the assignee of this application.

Wheel loaders manufactured by the assignee company, of a type to which the present invention is applicable, are generally discussed herein to serve as a background for the present invention, and to show desirability of the present invention. The vehicles are of substantial size and weight, and the dimensions and specifications play a substantial part in the features of the present invention.

Referring to FIG. 2 of the drawings, each of the wheel assemblies, only one of which will be described in detail, includes tire 32 mounted on a split rim 34, the wheel being generally designated 36. Each of these wheels, four in a four wheel drive unit, or at least two, in types of vehicles with which the invention is associated, will generally be separately driven from a power train through a differential, the housing of which is designated 38, and from which extends a hollow differential axle housing 40 terminating in end flanges 42, bolted at 44 to a wheel brake hub 46.

Axle drive shafts 48, shown in dotted lines, extend through the housing 40 to each wheel drive assembly, and each axle drive shaft 48 at its inner end is joined telescopically with a hub of a side gear of the differential, not shown.

An axle shaft support and housing member 56 (FIG. 3) is operatively secured to the hub, and has a central opening through which the axle shaft 48 extends. This support or housing 56 is stationarily secured to the hub, and by means of tapered bearing assemblies, generally designated 58 and 60, rotatably mounts a rotatable hub 62.

The disc brake assembly of the invention is generally designated 64, in FIG. 3. This brake assembly includes a plurality of brake discs arranged in multiple brake disc packs, and in a so called back to back arrangement.

The individual brake disc packs are shown generally at 66 and 68 and constitute respectively an inner pack and an outer pack. Suffice it to say at this point that fixed discs 70 in each pack are attached by splining at 72 to carrier supports or stators 73, and then in turn to fixed brake hub portions or back plates 74, operatively attached by bolts 76 to one another and to the end of stationary housing 56. Coacting discs 78 are splinedly connected at 80 to support members or rotors 82, which in turn are mounted on and attached for rotation with the rotatable hub member 62 by splining at 84. Discs 78 and 70 are of course slidable with respect to one another. The coacting or rotating discs 78 revolve with the wheel. Means generally indicated at 86 are utilized for operatively engaging the sets of discs, in the two packs and, as will be explained hereinafter, are operative in a serial arrangement to initially apply the brakes in one brake pack for an initial light braking, and subsequently, when a greater braking force is desired, the second brake disc pack is energized.

The rotatable hub 62 includes a bell shaped portion 88 and an annular portion 90. A peripheral ring 92 mounts and supports a rim mounting ring 94, the split rim sections 34A, 34B being interconnected by nut, bolts at 96, which further connect the so joined rim sections to the mounting ring 94.

Operatively mounted within, generally speaking, the annular section 90, there is a double stage or double planetary reduction gearing system generally designated 98, and which constitutes a final drive reduction system. The outer opening in the annular section 90 is closed by means of removable hub plate 100, an outer hollow hub member 102, constituting a removable part of a double separable hollow hub utilized in the final drive assembly, and a removable spacer plug 104.

The gearing in the final drive reduction assembly is shown and described in greater detail in my copending application for patent entitled Wheel Final Drive Assembly, Ser. No. 879,304, filed Feb. 21, 1978, to which reference is made herein, the structure, insofar as applicable to the present invention, being incorporated herein by reference.

Generally speaking, however, the drive axle shaft 48 operatively interconnects a vehicle power train drive differential, generally 38, with the final drive assembly by means of a splined end 106 on the axle shaft, which is operatively engaged in an internal splined hub of a primary sun gear 108 in the double reduction final drive gearing assembly. This final drive assembly, the rotatable hub sections and structure attached thereto, as also the structure within which the brake disc packs are positioned, in effect collectively constitute a closed assembly. The stationary hub, and the bearing assembly interconnections between the stationary and rotary hub portions, are contained within the closed assembly, and the structure overall basically defines an oil sump or reservoir 110, in the bottom portion of the closed casing. The sump holds lubricating and cooling oil at 112, extending substantially up to the center line of axle shaft 48. The lower portion of the final drive assembly, including the gears and carrying members therefor and, generally speaking, the lower half of the stationary and rotatable hub portions are likewise immersed in the oil in the reservoir.

In some previous structures this immersion in the lubricating and cooling oil, and associated mechanism, including passageways or oil supplying bores insured, in an oil flooded disc brake enclosed within the wheel of the wheel loader final drive, adequate circulation of cooling and lubricating oil within cavities so as circulate, to, through and around the disc brake packs, and individual discs, to adequately lubricate and maintain temperatures at desired levels. Such apparatus is shown in Cole et al U.S. Pat. No. 3,301,359, to which reference is made for such details.

The present invention is directed to braking mechanisms incorporated in substantially larger vehicles which, due to their weights, sizes, and speeds of movement, necessitate an enlarged braking system. Difficulties arise in providing sufficient braking because of many limiting factors. In devices such as shown in the Cole patent, only a single brake disc pack is used. This is inadequate for larger machines.

As machines grow in size, larger and larger brakes are needed. Increased braking capacity can be gained in three principal ways, namely by increasing the diameter, by increasing the number of friction surfaces, and by increasing the application pressure. Diameter increases are limited by manufacturing size capabilities; number of friction surfaces is limited by the efficiency of a pack and the cooling of that pack; and the application pressure by available state of the art control systems. The present invention generally speaking teaches a brake construction which allows staying within the above set forth limits, and at the same time permits increasing the brake capacity.

To attain the required capacity for large machine brakes, one or more of the listed limits would be exceeded if conventional brake systems are used. To overcome this problem in the present invention, the diameter and pressure limits are used, whereas the number of friction surfaces is allowed to go beyond the limit. To accomplish this the discs are divided into two equal packs for each brake, which brings the number of discs per pack down within the limit.

Multiple disc brakes are common, as also are multiple piston brakes. In the present invention however the multiple disc packs are positioned in a back to back arrangement, and a unique common actuator support is operatively positioned between the so disposed packs.

A plurality of actuating pistons are operatively mounted or carried by the common actuator, and operationally actuation of each pack is by half the number of plural pistons. Identical pressure plates are used transmit the piston force to the disc packs. Additionally, in accordance with the invention back plates are machined from a common casting. Rotors and stators used in the packs are, respectively, identical parts. These features lend simplicity and decrease costs of production. Additional advantages will appear hereinafter.

Other problems exist in structures which due to size and weight, embody the multiple braking concept of the invention, as regards lubrication and cooling of the brake units, and discs incorporated therein. This problem has also been solved by the present applicant, the details being incorporated in my copending application Ser. No. 879,305, entitled Brake Lubrication and Cooling System, filed Feb. 21, 1978, and assigned to a common assignee herewith. Reference is hereby directed to the details shown therein insofar as applicable to the present disclosure. As pointed out in this copending application, tapered roller bearings 114, such as in the tapered bearing assembly 58, and to a degree the tapered roller bearings 116 in bearing assembly 60, cause some limited oil flow in the apparatus, but this flow is inadequate for cooling and lubricating the large system involved.

In accordance with the invention and in order to overcome the cooling and lubricating difficulties, a rotating vaned pump ring, is provided, and is located close to the smaller end of the tapered roller bearings. The vanes of the pump ring operate in a manner to guide and forcibly pump oil from the reservoir into and through the roller bearing assembly, and into the brake containing area or cavity, whereafter it can flow to, through and around the brake pack discs.

Referring to FIGS. 3 and 5 of the drawings, axle shaft support and housing 56 is stationary, and the rotatable hub generally indicated at 62, is rotatable with the interposition of the bearing assemblies 58 and 60. The bearing assembly 58 is located in a passage 118 formed between the stationary housing and rotating hub portion, with the inner bearing race 120 being fixed and the outer bearing race 122 being rotatable with the rotating hub portion 62.

A stop member 124 operatively positions bearing assembly 58 in conjunction with a ring abutment 126. The oil pump ring is generally indicated at 128 (FIG. 3) and is positioned proximate the bearing assembly 58, and serves to pump oil from the reservoir 110 to the disc packs 66 and 68, all as set forth in my aforesaid copending application.

Referring now in greater detail to the multiple pack disc brake assembly and mechanisms forming the same, reference is made to FIG. 4 and following. The disc packs are operatively positioned between back plates 74 and pressure plates 130. Pressure plates 130 are operatively mounted for movement by a hydraulic braking system, as will be described, in order to apply pressure to discs 78 for braking pressure therebetween and the fixed discs 70. This creates a braking action on the rotatable hub 62.

The stators 73 are spaced at their inner ends and a common brake actuator support 132 is interposed therebetween and securely fastened, one to another, by means of bolts 134. The common actuator support has a plurality of recesses 136 therein comprising sets and opening in opposed directions. Multiple pistons 138 are slidably positioned in the recesses. Two oppositely directed sets of pistons 138 are slidably mounted in the recesses for respectively coacting with pressure plate 130A for actuation of the inner brake pack 66, and pressure plate 130B for actuation of the outer disc pack 68. These pistons, 138A and 138B, which respectively serve in sets to contact pressure plates 130A and 130B are alternately mounted in and spaced about the common actuator support 132 as shown in FIG. 4, and each is operable upon actuation of a brake pedal as will appear hereinafter. An advantage resides in the use of multiple pistons over a single actuating piston in a greatly reduced total length of pressure seal surface. This results in an increase in actuating efficiency.

Arranged between the pistons on each side of the actuator there are return springs, generally designated 140A and 140B, the letters correlating them with the piston sets. These return springs are arranged and positioned so as to return the pressure plates to their inactive or initial position, as will be described in detail hereinafter. Basically the various pistons are so functionally operable upon depression of the brake pedal as to initially activate the inner disc pack, and subsequently the outer disc pack when a greater braking force is desired. Subsequently upon release of the brake pedal the springs function to return the pressure plates to a zero brake application position. The brake pressure plates operate in conjunction with the various discs in a usual manner to compress the stack of discs, which are slidable axially due to the splining arrangement, all of which is known in the art.

The common actuator support is unique and is constituted of a unitary cast metal ring which includes an upper general T shaped configuration 142, and a depending leg portion 144. In a manner usual with castings, edge surfaces are generally curvilinear. Additionally the casting can incorporate therein relief openings or areas such as at 146, the relief areas serving for reducing weight and additionally, in conjunction with the fact that all surfaces and corners are generally rounded in castings, the relief areas, and corners, and surfaces, permit a substantially free and unobstructed flow of oil about the structure to facilitate lubrication and cooling of the disc brakes. This is significant in that the brakes in the present equipment are subject to very high heat in operation in the absence of adequate cooling.

The recesses 136 for pistons 138 are bored or drilled in the lower depending leg portion 144 of the common actuator support 134, and the hollow pistons are slidably contained therein. Seals 148 such as O-rings are provided on the piston skirts proximate its base for the usual function. A lateral port 150 is provided in the common actuator body, one end opening into the recess 136, and a further radial port 152 is provided to communicate at one end with the port 150. Two annuluses 156, 158 are provided in each of the stators 73 and these are in communication with the hydraulic system as generally shown in FIG. 9. The function of the annuluses is to pass oil under pressure into ports 152, 150, and thence to recesses 136 to act against the internal opening in the pistons. This moves the pistons outwardly from the recesses, engaging the inner ends of the pressure plates 130 to move the same, and thereby press the brake discs against one another, thereby applying braking force between the rotating and stationary hub portions in a known manner.

By reference to FIGS. 5, 6, and others, it will be seen that seals such as designated 160 are provided in that surface of common actuator support 132 in contact with the inner surfaces of stators 73, and positioned on either side of the annuluses 156, 158, the seals are functional in a known manner. It is to be noted that the oppositely operable pistons 138A and 138B in the present embodiment are 12 in number, there being six operable to actuate each of the disc packs 66, 68 respectively. The number of pistons can of course vary as needed, such as 10–14, for example. The recesses for the pistons are all formed in the common actuator support. The same is true of the return spring arrangement. This is a unique arrangement.

The arrangement and interconnection of an annulus with the respective ports leading to the piston recesses is shown more clearly in FIG. 4, for example, wherein a portion of stator 73 has been broken away, and showing the annulus 156 opening into the port 152 and the relationship thereof to the port 150.

It is also to be noted that the pressure plates 138 are provided with reliefs at 161 for decreased weight and mass, and by referring to FIG. 4 it will be seen that this recess exists peripherally, about the inner ends of these pressure plates and provides a good engagement surface for the pistons.

Means for deactivating the brakes, upon release of the brake pedal, consists of means for returning the pressure plates to an inactive or withdrawn position. To this end the common actuator support is provided with further spaced cut out areas at 162, intermediate the piston containing recesses, terminating in a recess 164 constituting a spring seat. A bore 166 extends from the bottom of spring seat 164 through the base of the support. Holes are provided at 168 through the pressure plates 130 terminating in recesses 170 therein. A pin 172 has a thin end portion extending through the bores and holes 166, 168, with the end terminating in recess 170, and having a snap retention ring 174 thereon. The opposite enlarged end of the pin has a cap 176, and extending between the cap and the base of the spring seat is a compression spring 178. Functionally, when hydraulic pressure is released from the pistons 138, the compression spring conjointly with the pin 172 retracts the pressure plates, and in the absence of pressure internally of the pistons this return movement or force on the pressure plates returns the pistons to a retracted inactive position. It will be noted that the return apparatus alternates with the pistons on each side of the common actuator.

A comparison of FIG. 5 with FIG. 6, noting the lines 5—5 and 6—6 on which taken in FIG. 4, will clearly show the fact that the common actuator support, the casting in which the various openings and passages are formed, provides for the plurality of opposite sets of pistons and return springs which respectively serve for operation of the outer disc pack and the inner disc pack. The overall association and positionment is disclosed in FIG. 4, whereas FIG. 5 discloses the mechanisms for operating the outer disc pack, and FIG. 6 shows the mechanism for operating the inner disc pack. The description as above set forth applies equally to the two sets of pistons and return springs.

The pressure plates to transmit the piston force to the disc packs are identical. The base of the pressure plates and the seating area configurations on the common actuator ring are such that position piston contact and full retracted seating are realized.

As recited previously, actuation of the brake pedal serves to serially, or sequentially, first actuate one disc pack, and upon further depression additionally actuate the second disc pack. FIG. 3 includes a broad indication of two separate hydraulic lines leading from the brake pedal valve to the annuluses for the outer and inner disc packs. The line 180 leads to annulus 158 for actuation of the outer pack and line 182 leads to annulus 156 for actuation of the inner disc pack.

Reference is made to FIGS. 7, 8 and 9 which more clearly show the hydraulic system and control for the brake actuation. FIG. 9 shows the service brake hydraulic schematic for the dual operation, dual pack brake operating system as applied to a four wheel vehicle, with inner and outer brake packs associated with each of the wheels. In some constructions possibly only two of the wheels would include the double back to back disc brake system, but in vehicles of substantial sizes and weights, as discussed hereinbefore the double brakes will be applied to each of the four wheels of the vehicle.

Referring now specifically to FIG. 9, the circuit includes an oil sump or reservoir 184, with a conventional pump 186 operable to pump fluid through the system, and initially into an accumulator charging valve with relief to sump 190. Accumulator 192 is in the circuit for the usual function of containing oil at design operating pressure. Oil from the accumulator passes through a service brake valve 194 which is operable from the brake pedal 196 to direct the oil to the operating means, the pistons, for actuating the respective outer and inner disc packs. Functionally, when the brake pedal is depressed to initiate brake actuation it at the same time actuates neutralizer valve 198 which blocks the vent to sump 200, and additionally supplies oil pressure to a means in the transmission, which deactivates drive through the transmission in a conventional manner. The line to the transmission neutralizer is indicated at 202.

As discussed above, when the brake pedal is depressed through a first increment or distance the service brake valve opens line 204 which introduces oil to the outer brake pack 68 on each of the wheels as indicated. This introduction of oil actuates the pistons 138B and therethrough the outer disc packs. A second increment of actuation of the brake pedal, that is further depression or movement, opens line 206 which activates or actuates the inner brake disc packs 66, as also indicated in FIG. 9. Upon release of the brake pedal, pressure is relieved in the different lines or neutralized through neutralizer valve 198, and sequentially the return springs 178 will return the pressure plates to a retracted position, and the brakes in the packs are released or deactivated. Transmission function will thereupon be resumed in a normal manner.

FIG. 7 schematically shows the result of an initial brake pedal stroke, which introduces oil under pressure through line 204 into annulus 156 and then through ports 152 and 150 to move pistons 138B, all as indicated by flow arrows in the Figure, to move pressure plate 130, and thereby actuate the outer brake disc pack as indicated. It is noted that the inner brake disc pack is unactuated in this operating condition.

As schematically shown in FIG. 8, continued brake pedal stroke not only introduces oil through line 204 to actuate the outer brake disc pack, but also sends oil through line 206, introduces oil through annulus 158 and the ports in the common actuator support 132, leading to pistons 138A, as shown by the arrows in this Figure, to activate the inner brake disc pack. At the same time the outer brake disc pack remains actuated and a composite or additive brake application is realized.

The brakes are released, upon release of the brake pedal, in the reverse sequence of the actuation thereof as set forth above.

As described hereinbefore the size and weight of vehicles in which the double back to back brake pack assembly is incorporated, or used, results in very substantial forces in movement which must be overcome in slowing or stopping, and it is for this purpose that the present composite brake system has been devised but basically such a system is not new. Substantial heat can be generated in the brake disc packs, and this heat problem must be alleviated, overcome, or prevented. It is for this purpose that the brake lubricating and cooling system as set forth in my aforementioned copending patent application has been devised.

In addition, however, the configuration and construction of the common actuator support 132, has a minimum of possible areas or points of obstruction to oil flow. In addition relief areas are provided for weight reduction, and the design permits free and unobstructed flow of oil in addition to eliminating as much weight of material in the actuator as possible.

It is of substantial significance, and unique, to use a single cast ring to produce the common actuator support 132, which is then drilled on opposite sides for the two series of pistons to actuate the outer and inner disc packs, with all passages or ports being drilled to effect the function thereof. It is also to be noted that there are 12 pressure plate actuating pistons in the system, which are alternately arranged, with six in either direction for respective actuation of the outer and inner packs. At the same time there are six return springs in one direction to retract the pressure plates for one set of the brakes, and six in the other direction for the other set. Again all of these return spring arrangements are likewise provided for in the common actuator support by providing openings and holes therein subsequent to the casting.

As an added heat reduction factor it is to be noted that the carrier supports or stators 73 in effect constitute cooling vanes, or carry cooling vanes, indicated at 208. It is also to be noted that, for strengthening purposes, stator member 73, spacedly around the brake containing casing, is provided with plug like members 210 which are solid and provide for passage of bolts 212 into the member 132 for strengthening of the overall structure.

Recapitulating, multiple piston brakes are known and multiple disc brakes are common. The present invention however teaches for the first time a brake system utilizing in a back to back arrangement, multiple piston actuation brakes. As machines grow in size, larger and larger brakes have been found to be required. Increased capacity is possible in three principal directions, increasing diameter, increasing number of friction surfaces, and increasing application pressure. Limiting factors are encountered however in that diameter increases are limited by manufacturing size capabilities, number of friction surfaces is limited by the efficiency of a pack and the cooling of that pack, and the application pressure by the state of the art of the control systems. The present brake system allows staying within the listed limits and yet provides for increased braking capacity.

To obtain the required capacity for the large machine brakes, one or more of the listed limits would be exceeded if conventional brake systems were used. In overcoming this problem, the diameter and pressure limits are used and the number of friction surfaces is allowed to go beyond the limit. These discs are then divided into two equal packs for each brake, which brings the number of discs per pack down within the limits. The disc packs are positioned back to back, with a unique common actuator support between them, and which common actuator support constitutes an essential feature of the invention. The actuation of each pack is accomplished by half of a number of actuating pistons contained in the common actuator support. The pistons are arranged in sets of six on opposite sides of the actuator support. Identical pressure plates are used to transmit the piston forces to the respective disc packs. Back plates are machined from a common casting, and rotors are identical parts, as are the stators. The latter results in simplicity and functional efficiency.

With this arrangement, for light to normal severity of braking, a hydraulic control means applies one pack of discs with a partial brake pedal movement, and at a predetermined point of pedal movement and pressure, the second pack of discs is applied for heavier to maximum severity braking. This provides a better modulation of application for smoother braking. It is also to be noted that the use of multiple pistons provides an additional advantage over a single actuating piston in that there is a substantially reduced total length of pressure seal surface, and this results in an increase in actuating efficiency.

While a preferred embodiment of the invention has been shown and described herein, manifestly minor changes in details of construction can be effected without departing from the spirit and scope of the invention as defined in and limited solely by the appended claims.

I claim:

1. A double, disc type brake system for wheeled vehicles, including two toroidal disc packs, operationally combined in a working set, for each vehicle wheel to be braked, said disc packs in each set being respectively operationally placed in back to back relationship, multiple hydraulically operated pistons for actuation for each said disc pack, said multiple pistons consisting of two oppositely faced piston sets operatively mounted on opposite sides of a common circular actuator support centrally disposed between the two disc packs, said pistons on each of said sides of said common actuator support being radially circumferentially spaced around said support in circular arrays and mounted for reciprocating operational movement, said pistons on one side of said common actuator support being respectively radially alternatively positionally arranged intermediate said pistons on the opposite said side, said pistons of each said piston set being respectively operable in unison as a set by movement outwardly to selectively operationally contact and actuate respectively, and substantially circularly thereabout, a said disc pack on one respective side or the other of said common actuator, and a hydraulic system operable to initially actuate a first said piston set and thereby a first one of the disc packs in each said set upon movement of a vehicle brake pedal through a first increment of application for light braking action, and to subsequently inclusively actuate the other disc pack of the set upon movement of the pedal in an additional increment of application for increased braking action.

2. A double, disc type brake system as claimed in claim 1, each said disc pack including a pressure plate operable for engagement with a disc in said disc packs to implement a braking action on the wheel with which associated, said common actuator support being disc shaped and having a plurality of recesses formed in each opposite surface thereof, said recesses on each side being one-half of the number of said multiple pistons and being angularly spaced about said disc, each piston set including a number of pistons commensurate with said recesses on one said surface, said pistons being slidably mounted in said recesses, and said hydraulic system being operable to introduce oil under pressure into said recesses to thereby move said pistons outwardly into engagement with said pressure plate for actuation of said disc brake.

3. A double, disc type brake system as claimed in claim 2, each said side of said common actuator support including additional recesses in the face thereof intermediate said piston containing recesses on the same said side, said additional recesses having openings through the bottoms thereof, each said pressure plate having a face recess therein with a hole extending therefrom through the bottom of said pressure plate, pins in said additional recesses having an end extending through the bottom openings therein and through the holes in said pressure plates and into the recesses therein, retainer rings on the end of said pins within said recesses, compression springs surrounding said pins in said recesses and operable upon release of hydraulic pressure to said pistons to return said pressure plates to a withdrawn inactive position.

4. A double, disc type brake system as claimed in claim 3, said common actuator support being of cast construction with said recesses bored therein, said common actuator member including ports in the body thereof in communication with said piston mounting recesses, and operatively connected to the hydraulic system for selective introduction of actuating fluid into said recesses for movement of said pistons therein.

5. A double, disc type brake system as claimed in claim 4, said disc packs including a plurality of interleaved and interacting brake discs, said brake discs being in stationary and rotatable sets thereof, means mounting said stationary set, means mounting said rotatable set, said means mounting said stationary set being attached to a vehicle fixed wheel hub, said stationary disc mounting means including two stators each attached at one end thereof to said fixed hub and being disposed intermediate the back to back disc packs, said common actuator support having a central portion disposed between the inner ends of said stators and being fixedly secured to and depending therefrom, each said stator having an annular in the inner surface thereof operatively interconnected with the hydraulic system, each said annular being operatively connected into selected said ports in said common actuator support interconnected with respective piston containing recesses on opposite sides of said common actuator support, the two annuluses being respectively operative to introduce hydraulic fluid selectively to each of the piston sets containing recesses to selectively actuate the pistons in each said set, and therethrough the pressure plates for each of said back to back disc packs for functional operation thereof.

6. A double, disc type brake system as claimed in claim 5, the body of said common actuator support having sealing means in the surface thereof, adjacent and surrounding each said annulus, said pistons each having an open interior with the opening therein being at the bottom of the recess, and the skirt of each piston having sealing means therein in operative contact with the interior wall of said recess.

7. A double, disc type brake system as claimed in claim 6, said pressure plates having raised bosses on the base thereof, said pistons having flat top surfaces, said flat top surfaces engaging said raised bosses of said pressure plates for actuation thereof.

8. A double, disc type brake system for wheeled vehicles, including two toroidal disc packs, operationally combined in a working set, for each vehicle wheel to be braked, said disc packs in each set being respectively operationally placed in back to back relationship, multiple hydraulically operated pistons for actuation of each said disc pack, said multiple pistons consisting of two oppositely faced piston sets operatively mounted on opposite sides of a common circular actuator support centrally disposed between the two disc packs, said common actuator support having a plurality of radially circumferentially spaced and outwardly open recesses therein on the opposite sides thereof and being spaced around said support in circular arrays and within which said pistons are mounted for reciprocating operational movement, said recesses on one side of said common actuator support, and the pistons therein, being respectively radially alternatively positionally arranged intermediate said recesses, and the pistons therein, on the opposite side of said common actuator support, said pistons of each said piston set being respectively operable in unison as a set by movement outwardly in said recesses to selectively operationally contact and actuate respectively, and substantially circularly thereabout, a said disc pack on one respective side or the other of said common actuator, and a hydraulic system operable to initially actuate a first said piston set and thereby a first one of the disc packs in each said set upon movement of a vehicle brake pedal through a first increment of application for light braking action, and to subsequently inclusively actuate the other disc pack of the set upon movement of the pedal in an additional increment of application for increased braking action.

9. A double, disc type brake system for wheeled vehicles, including two disc packs, operationally combined in a working set, for each vehicle wheel to be braked, said disc packs in each set being respectively operationally placed in back to back relationship, multiple hydraulically operated pistons for actuation of respective ones of said disc packs, a common actuator support centrally disposed between said disc packs and having a plurality of piston receiving recesses in the opposite sides thereof slidably operably mounting said pistons in said sets on said opposite sides, each said disc pack including a pressure plate operable for engagement with a disc in said disc packs to implement a braking action on the wheel with which associated, a hydraulic system operable to introduce oil under pressure into the recesses to selectively actuate said piston sets sequentially into contact with said pressure plates for brake implementing disc engagement thereof, each said side of said common actuator support including additional recesses in the face thereof intermediate said piston containing recesses on the same said side, said additional recesses having openings through the bottoms thereof, each said pressure plate having a face recess therein with a hole extending therefrom through the bottom of said pressure plate, pins in said additional recesses having an end extending through the bottom openings therein and through the holes in said pressure plates and into the recesses therein, retainer rings on the ends of said pins within said recesses, compression springs surrounding said pins in said recesses and operable upon release of hydraulic pressure to said pistons to return said pressure plates to a withdrawn inactive position, said pressure plates having raised bosses on the base thereof, said pistons having flat top surfaces, said flat top surfaces engaging said raised bosses of said pressure plates for actuation thereof, said pressure plates additionally having a raised boss in the region of said recesses through which the return pins pass, said common actuator support having a stepped face at the base of said recesses operatively mating with the boss on said pressure plate.

10. A double, disc type brake system for wheeled vehicles, including two disc packs, each consisting of interleaved and operationally interacting sets of stationary and rotatable brake disc sets for each vehicle wheel to be braked, said disc packs of the sets being respectively operationally placed in back to back relationship, multiple hydraulically operated pistons for actuation of the respective said disc packs, said multiple pistons constituting two oppositely faced piston sets operatively positioned in an intermediate common actuator support disposed between the disc pack sets, said pistons of each said piston set being respectively operable to actuate one said disc pack, each said disc pack including a pressure plate operable for engagement with a disc in a said disc pack to implement a braking action on the wheel with which associated, said common actuator support having a plurality of recesses formed in sets on each opposite surface thereof, and being angularly spaced around said support in a circular array thereabout, each piston set including a number of pistons commensurate with said recesses, said pistons being slidably mounted in said recesses, a hydraulic system operable to selectively introduce oil under pressure into one or both of said sets of recesses, to thereby move the pistons therein outwardly into engagement with a said pressure plate for actuation of said disc brakes, additional recesses in opposite faces of said support intermediate said piston containing recesses and having bottom openings therethrough, said pressure plates respectively having face recesses therein with a hole extending therefrom through the bottom of said pressure plate, pressure plate return pins extending through the additional recess bottom openings and through the holes in said pressure plates and into the recesses therein, springs operatively connected to said pins and operable upon release of hydraulic pressure to said pistons to return said pressure plates to a withdrawn inactive position, said pressure plates having raised bosses on the base thereof, said pistons having flat top surfaces, said flat top surfaces engaging said raised bosses of said pressure plates for actuation thereof, said pressure plates additionally having a raised boss in the region of said recesses through which the return pins pass, and said common actuator support having a stepped face at the base of said recesses operatively mating with the boss on said pressure plate.

* * * * *